United States Patent
Walter et al.

(10) Patent No.: US 6,907,373 B2
(45) Date of Patent: Jun. 14, 2005

(54) METHOD FOR CALIBRATING A SENSOR AND SWITCHING ARRANGEMENT FOR OPERATING A SENSOR

(75) Inventors: Klaus Walter, Bietigheim-Bissingen (DE); Rasmus Rettig, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 10/367,348

(22) Filed: Feb. 14, 2003

(65) Prior Publication Data

US 2003/0158681 A1 Aug. 21, 2003

(30) Foreign Application Priority Data

Feb. 21, 2002 (DE) .......................................... 102 07 228

(51) Int. Cl.⁷ ............................................. G06F 19/00
(52) U.S. Cl. ........................................ 702/104; 702/85
(58) Field of Search ........................... 702/85, 104, 92, 702/94, 95, 115, 116, 150, 151, 152, 108, 117, 127, 33, 57, 103, 105, 189; 73/1.01, 1.02, 1.08, 1.42, 1.75, 1.79, 1.82; 181/296; 374/1; 700/1

(56) References Cited

U.S. PATENT DOCUMENTS

| | | | | |
|---|---|---|---|---|
| 2,973,504 A | * | 2/1961 | Bobber et al. ................ 367/87 |
| 3,054,864 A | * | 9/1962 | Koidan ........................ 381/58 |
| 4,039,767 A | * | 8/1977 | Leschek ..................... 73/1.82 |
| 4,099,495 A | * | 7/1978 | Kiencke et al. ........ 123/406.65 |
| 4,285,240 A | * | 8/1981 | Gold ............................ 73/462 |
| 4,391,124 A | * | 7/1983 | Drost et al. ................. 73/1.82 |
| 4,434,648 A | * | 3/1984 | Drost et al. ................. 73/1.82 |
| RE31,971 E | * | 8/1985 | Gold ............................ 73/462 |
| 4,951,236 A | | 8/1990 | Kawate et al. |
| 4,982,351 A | | 1/1991 | Kawate et al. |
| 5,033,010 A | * | 7/1991 | Lawrence et al. ............ 701/35 |
| 5,038,306 A | * | 8/1991 | Kellett ....................... 702/105 |
| 5,051,937 A | | 9/1991 | Kawate et al. |
| 5,371,367 A | * | 12/1994 | DiDomenico et al. ... 250/338.5 |
| 5,644,067 A | * | 7/1997 | Gabrielson .................. 73/1.39 |
| 6,487,480 B2 | * | 11/2002 | Haas ............................. 701/29 |
| 2001/0029413 A1 | | 10/2001 | Haas |

FOREIGN PATENT DOCUMENTS

EP           0 245 031 B1    11/1987

OTHER PUBLICATIONS

Zhou, D; Peirlinckx, L; Van Biesen, L; "A Novel Parametric Technique for the Calibration of Electroacoustic Transducers"; IEEE Instrumentation and Measurement Technology Conference; May 18–20, 1993; pp236–242.*

Morash, P; Wortley, C; Trider, R; "A High Speed Digital Data System for Underwater Acoustic Measurements"; Oceans; vol. 3; Sep. 1971; pp 377–380.*

* cited by examiner

*Primary Examiner*—John Barlow
*Assistant Examiner*—Douglas N Washburn
(74) *Attorney, Agent, or Firm*—Michael J. Striker

(57) ABSTRACT

A method for calibration of a sensor 1 is characterized in that the sensor 1 is arranged in a predetermined position, an equalizing unit 6 is connected to the sensor 1, data necessary for calibration are determined, and the determined calibration data are stored permanently in a storage medium 5.

12 Claims, 3 Drawing Sheets

METHOD FOR CALIBRATING A SENSOR AND SWITCHING ARRANGEMENT FOR OPERATING A SENSOR

BACKGROUND OF THE INVENTION

The present invention relates to a method for calibrating a sensor, as well as a switching arrangement for operating a sensor, which has means for detecting data for calibrating the sensor and which has a storage medium, in which the calibration data are storable.

In particular, in the region of magnetic sensors for speed and position detection of elements of a motor vehicle for example, for an anti-blocking system (ABS) or the motor regulation, until now, very high specifications for the reliability, accuracy, and speed of the sensors, for example, Hall sensors, AMR sensor, or GMR sensors, were established. Frequently, however, features for improvement of one parameter are applied to other parameters. For example, in consideration of insensitivity compared with vibrations, it is advantageous to use a sensor with a minimal sensitivity. In consideration of a provided faint signal, in practice, which is to be detected by the sensor, it is desirable, however, to use a sensor with the greatest possible sensitivity.

For example, with magnetic sensors for detection of a speed or position of a shaft with reference to a wheel, which are arranged such that the front side of a tooth of a transmitting gear wheel passes on the sensor, a sensor with a minimal sensitivity can be used with a very small air gap, which is insensitive as compared with vibrations. A small air gap, however, requires a high precision upon construction, which is disadvantageous as far as manufacturing costs go. In consideration of tile simplest construction, a larger air gap has the advantage, but requires a more sensitive sensor. Calibration methods provide an improvement. A calibration method for a system in a motor vehicle that is dependent one sensor is known from DE 100 17 278.4.

A problem addressed by the present invention is to provide a method for calibrating a sensor with reference to a switching arrangement for operation of a sensor, such that the sensor has improved characteristics relative to its structural position.

SUMMARY OF THE INVENTION

According to the present invention, a method for calibrating a sensor is characterized in that the sensor is arranged in a predetermined position, an equalizing unit or a control apparatus is connected to the sensor, which determines data that is necessary for calibration, and in which the determined calibration data are stored permanently in a storage medium.

In addition, the present invention includes a switching arrangement for operating of a sensor, which has means for detection of data for calibrating of the sensor and a storage medium, in which the calibration data are storable, characterized in that the storage medium is a nonvolatile storage medium.

Therefore, in that the data necessary for calibration are determined by a sensor, when the sensor is arranged in a predetermined position and when an equalizing unit or a control apparatus is connected to the sensor, and the determined calibration data are stored permanently in a nonvolatile storage medium, the calibration data can exist upon each initiation of operation of the sensor without a time delay. It is no longer necessary that the sensor is calibrated with each initiation of operation.

By means of the inventive detection of calibration data, in addition, the advantage is provided that calibration data can be determined disturbance-free. Therefore, while it is not ensured with common calibration of a sensor that during the determination of the calibration data, no outer disturbances occur, such as, for example, vibrations, since the detection of the calibration data takes place with each initiation of operation of the sensor, that is, at the desired point in time and with the desired environmental conditions, the calibration according to the inventive method can take place with defined specifications.

It is particularly advantageous when the equalizing unit or the control apparatus emits a predetermined signal, which is led to the sensor. In this manner, the calibration and storage of the calibration data in the nonvolatile storage medium take place with each initiation of operation, in particular, however, with the first initiation of operation of the sensor in a simple manner. It is very advantageous when the calibration data with the first initiation of operation of the sensor is stored in the nonvolatile storage medium and is secured against overwriting. In this manner, the necessary calibration data for the sensor exists after the first initiation of operation of the sensor with each further initiation of operation of the sensor without a time lag.

In another embodiment of the invention, the calibration in the inventive method can take place directly after manufacture of the sensor, that is, for example, on the rear end of the assembly line of the sensor production. In this manner, it is achieved in an advantageous manner that a sensor is adjusted, which minimizes already entire manufacturing tolerances.

Particularly advantageous is when the predetermined position corresponds with the later construction situation for each individual sensor. In this manner, a sensor can be adjusted, which in consideration on its later use, is already very well optimized. This means that the sensor is as sensitive as necessary (attainment of the air gap) and at the same time, is as insensitive as possible against vibrations. By means of the optimal adaptation of the sensor sensitivity to the actual construction position in the vehicle, a start of the sensor with suitable, pre-programmed calibration of a sensor run without rapid phase change or mistaken output signals is permitted.

It is also particularly advantageous, however, when the calibration takes place after a determined construction of the sensor, as provided with a further, particular embodiment of the invention. In this manner, since the calibration takes place first after the construction of the sensor, approximately all tolerances are balanced. Thus, electrical and mechanical tolerances of the sensor itself, as well as construction tolerances of the sensor, are taken into consideration upon the calibration. Therefore, there need not be great attention paid to these elements upon construction of the sensor, which very advantageously affects manufacturing costs.

In a further, particular embodiment of the present invention, it is provided that the authorized construction position is located in a motor vehicle, in which the sensor is connected with a control apparatus. With the arrangement of the sensor in a motor vehicle, the inventive method offers a big advantage, since here, the above-described problem is increased.

A further embodiment of the present invention is also advantageous, in which the calibration as well as the detection and storage of the calibration data is initiated in the nonvolatile storage medium by means of a start signal. In this manner, it can be guaranteed in a simple way that the calibration of the sensor and the storage of the calibration data in the nonvolatile storage medium, then, only take place with the surrounding characteristics are optimal. The start signal can be produced manually; however, it also can be produced, for example, by means of the control apparatus of a motor vehicle or an external control.

In another form of the present invention, an external equalizing unit is connected to the sensor, a function to be detected from the sensor is executed at least once, the corresponding emitted signal from the sensor is checked in the equalizing unit for plausibility, and with plausibility, the calibration data is written in the storage medium.

The external equalizing unit, for example, can be made ready in a service station or Kfz workshop. There, likewise, the function to be detected from the sensor can be manually executed once. This means, with a sensor for detecting the rotation of a wheel of a motor vehicle, as is used for example with an anti-blocking system (ABS), the wheel can be rotated manually one or more rotations. In the equalizing unit, comparison values are stored, with which the signal emitted from the sensor are compared. If the equalizing unit recognizes that the signal emitted from the sensor corresponds to the expected value, that is, that the calibration of the sensor was successfully performed, then the calibration data is written into the storage medium. This can happen, for example, by means of an increase for a short time of the supply voltage, as is provided in a further, particular embodiment of the present invention.

According to a further, particular embodiment of the invention, the inventive method provides that the function to be detected by the sensor is performed at least once, the correspondingly emitted signal from the sensor being checked in the control apparatus for plausibility, and with plausibility, the calibration data is written into the storage medium. With this type of embodiment, it is not necessary to seek a service point or a Kfz work station for calibration of the sensor. The problems of the previously-described equalizing unit are overcome with the embodiment described here of the control apparatus of the motor vehicle. It must also be noted, however, that the detection of the calibration data takes place at a time point, in which no disturbances are present.

If multiple sensors are provided that serve the same purpose, the plausibility check is performed in an advantageous manner, in that the output signal of the sensor to be calibrated is compared with the output signal of another sensor. If the output signals run the same result, this means that the signals provided from the sensor to be calibrated are correct and the signal can be calibrated.

Particularly advantageous is an embodiment of the invention, in which a part of the permanently stored data can be changed during the operation of the sensor. This has the advantage that the sensor has calibration data at its disposal immediately after switching on; a part of this data, however, during the normal operation of the sensor, based on changed conditions, can be changed. For example, then, the calibration data, which, for example, compensate mechanical structural tolerances, are prevented from being overwritten, whereas calibration data, which, for example, are dependent on temperature, can be changed. This means that the sensor is indeed optimally securely calibrated in view of determined tolerances, while it can be post-calibrated in view of other tolerances from time to time. This includes the possibility of leaving unchanged the starting value contained in the nonvolatile storage medium after switching on, however, within an operating cycle, permitting changes.

By means of the inventive method, or as the case may be, by means of a switching arrangement according to the present invention, an optimal adaptation to the sensor sensitivity and the structural situation is ensured in an advantageous manner. This results in minimized vibration sensitivity after switching on of the sensor with a simultaneous maximization of the achievable air gap. In addition, a quick and correct re-running after low voltage is enabled.

The inventive equalizing concepts are useable independently from the respective sensor technology (for example, Hall, MR, GMR) and can supplement existing equalizing algorithms.

Further characteristics, features, and advantages of the present invention are provided in the following description of particular embodiments with reference to the accompanying drawings.

DETAILED DESCRIPTION OF THE PREFERRED EMBODIMENTS

Figure 1:
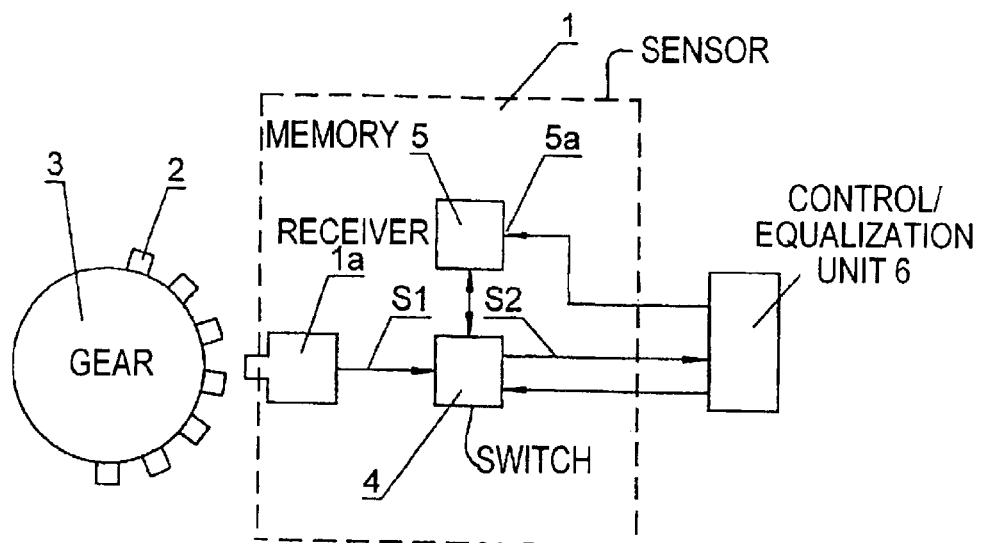
FIG. 1 shows a first inventive calibration arrangement.

As can be seen from FIG. 1, a receiver 1a of a sensor 1, by means of which the speed of a gear wheel 3 is detected, which for, example, is a transmitting wheel of an ABS system or an engine control, is arranged such that the front sides of the teeth 2 of the gear wheel 3 pass over on the receiver 1a of the sensor 1. By means of the passing over of the teeth 2 on the receiver 1a of the sensor 1, a field intensity change in the receiver 1a of the sensor 1 is generated.

The field intensity change is converted from the receiver 1a of the sensor 1 into an electrical signal S1. The electrical signal S1 is prepared in a switching arrangement 4 that is connected with the receiver 1a of the sensor 1. The prepared signal S2 is led to a control unit 6 (also referred to herein as an equalizing unit 6), for example, a control apparatus, in which it is processed accordingly.

The switching arrangement 4 is connected with a storage medium 5, in which data can be permanently stored. The switching arrangement 4 and the storage medium 5 are components of the sensor 1. The equalizing unit 6, for example, an integrated circuit (IC), can be components of the sensor 1 or an external assembly. In so far as the data from the switching arrangement 4 stored on the storage medium 5 is saved, a corresponding storage signal is placed from the equalizing unit 6 to an operating input 5a of the storage medium 5. Such a storage signal corresponds, for example, with a brief raising of the supply voltage.

Figure 2:
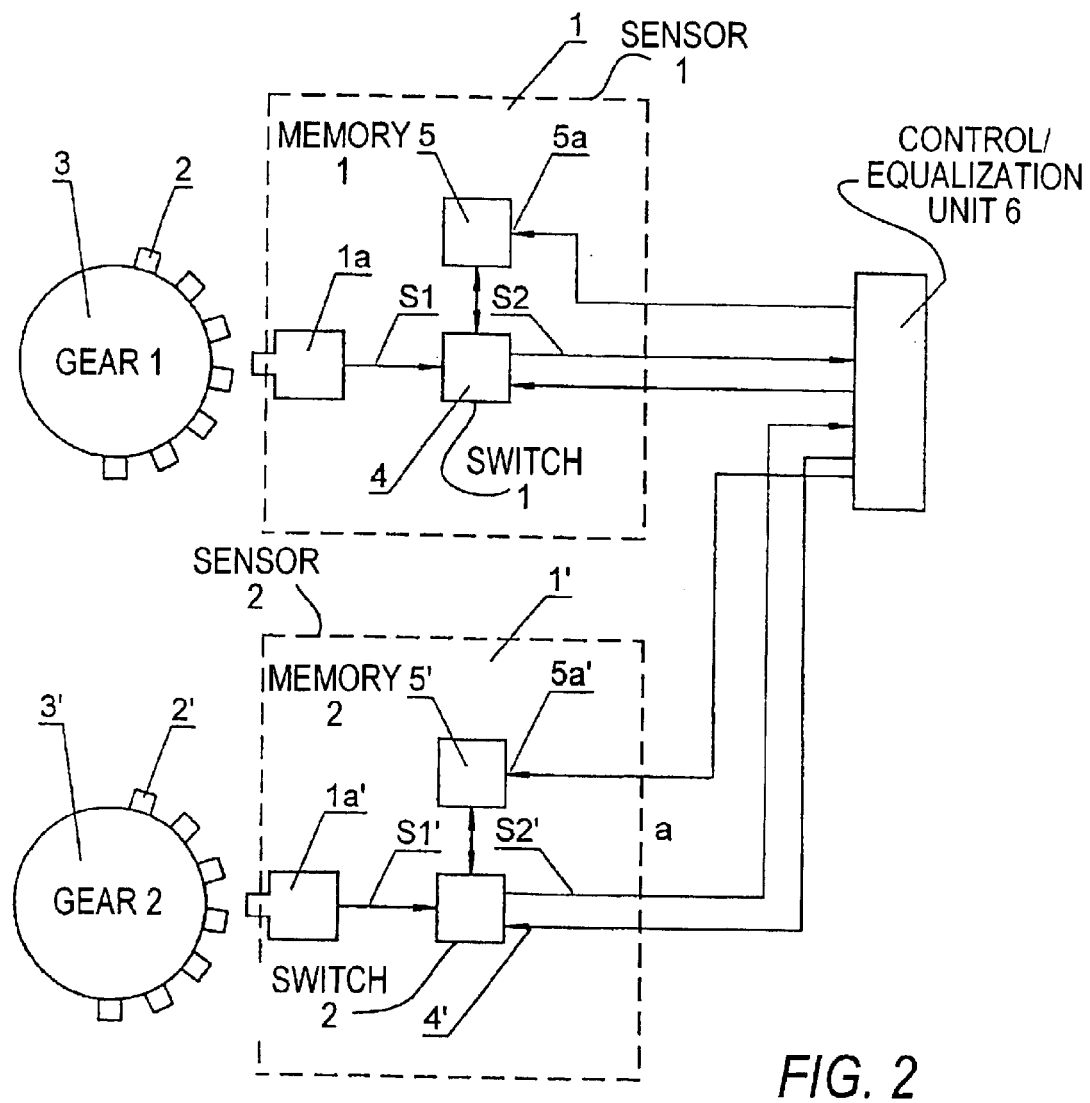
FIG. 2 shows a second embodiment of the inventive calibration arrangement.

The previously described arrangement of FIG. 2 is provided once more in identical form up to the equalizing unit 6. The same elements have the same reference numerals. However, to differentiate, they are provided with an apostrophe.

Upon a first use of the sensor 1, the stored data from the switching arrangement 4 to the equalizing unit 6, or the control apparatus 6, is compared with the stored data from the switching arrangement 4' to the control apparatus 6. If the comparison provides that the stored data from the switching arrangement 4 to the control apparatus 6 are not incorrect, the control apparatus 6 provides a command for calibrating of the sensor 1. The calibration data are input into the storage medium 5, in which they are permanently stored, based on a signal likewise output from the control apparatus 6.

Figure 3:
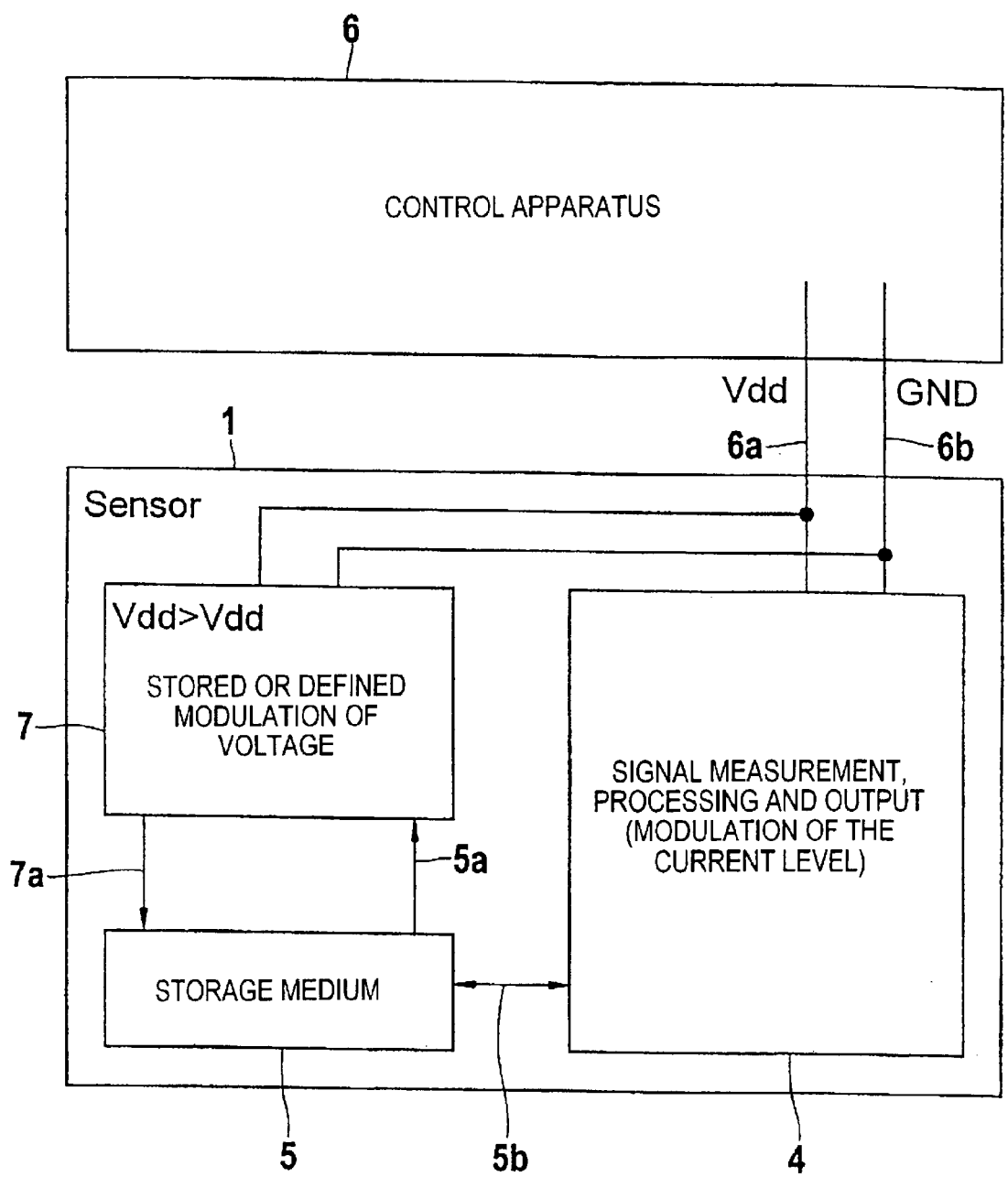
FIG. 3 shows a schematic representation of a switching arrangement for initializing the nonvolatile storage medium of the sensor-internal calibration data.

In FIG. 3, a schematic representation of a switching arrangement for initializing the nonvolatile storage of the sensor-internal calibration data is shown. As can be seen from this figure, the voltage supply of a control apparatus 6 is connected with the voltage supply of a sensor 1. Internally, the voltage supply of the sensor 1 is connected in particular with the switching arrangement 4 and a switching element 7, which, for example, can evaluated a brief increase of the supply voltage or a modulation of the supply voltage. An output 7a of the switching element 7 is connected with a storage medium 5. A first output 5a of the storage medium 5 is connected with the switching element 7. In addition, a second output 5b of the storage medium 5, via which bidirectional data can be sent, is connected with the switching arrangement 4.

As already noted in the description of FIGS. 1 and 2, the switching arrangement 4 inputs the optimal calibration data determined for the sensor 1 on the storage medium 5. These data are permanently stored in the storage medium 5, based on a signal sent from the equalizing unit 6.

The storage of the data in the storage medium is thereby input, such that the equalizing unit 6 establishes an increased voltage on the lines 6a, 6b to the voltage supply, for example. This increased voltage is recognized by the switching element 7, which then emits a signal at its output 7a to the storage medium 5, whereupon the storage medium 5 permanently saves the data on the bidirectional output 5b. After saving of the data, the storage medium 5 provides a signal via its first output 5a to the switching element 7, whereby it is determined that the switching element 7 not once yet has issues a signal for storing the data at its output 7a. The suppression of the storage signal could be assumed, however, also by the equalizing unit 6.

Upon a new starting of the sensor 1, the data stored in the nonvolatile storage medium are read by means of the second output 5b from the switching arrangement 4 and are used for calibrating of the sensor 1. In this manner, the sensor 1 is already directly calibrated after the start of operation. It is no longer necessary first to determine the calibration data and thereafter, conduct the calibration of the sensor.

Figure 4:
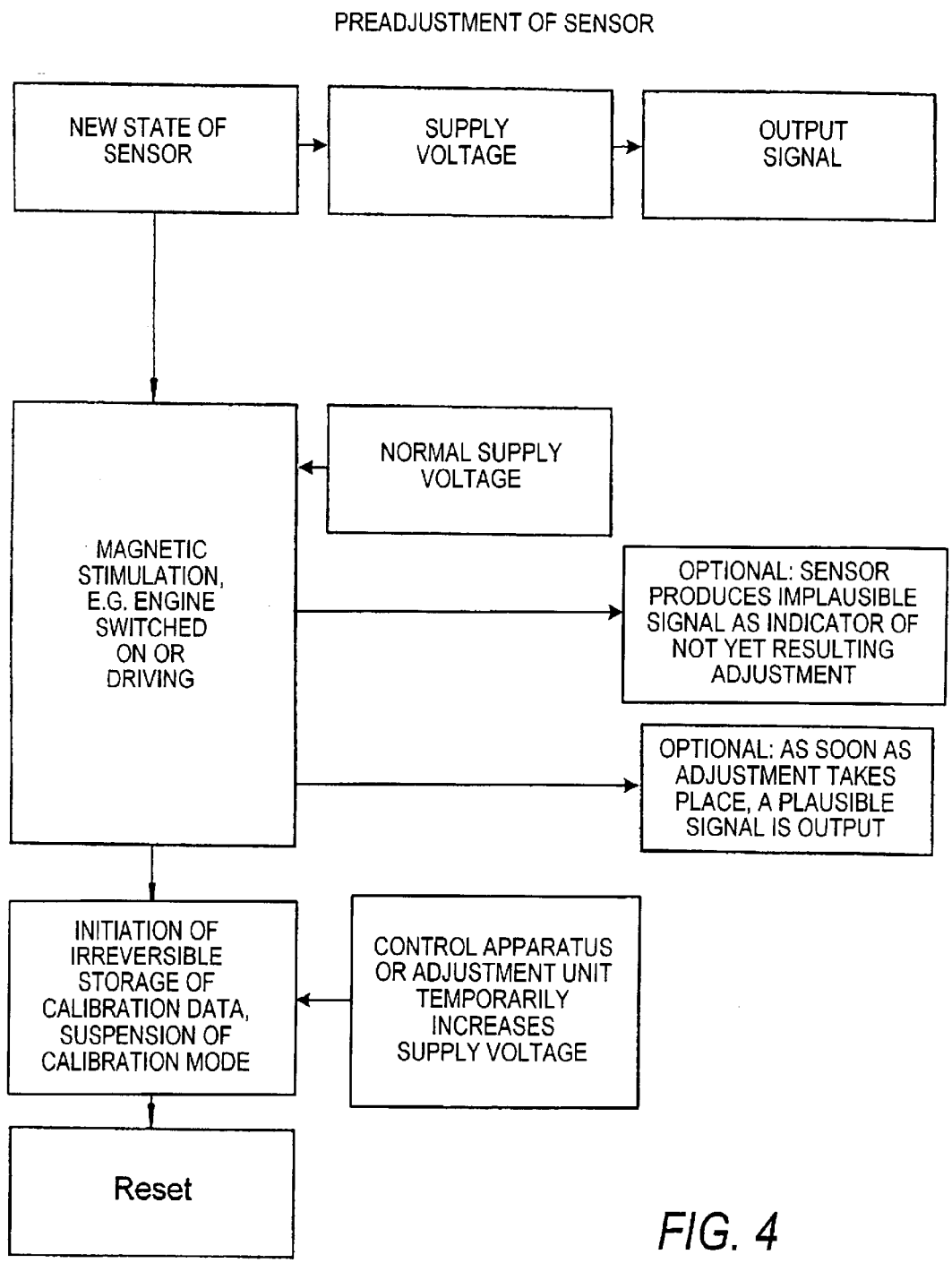
FIG. 4 is a flow chart of the equalizing procedure.

The flow diagram shown in FIG. 4 illustrates the inventive method for calibration of a sensor. As can be seen from FIG. 4, a sensor in new condition first is preadjusted for a determined supply voltage and a determined output signal. After the sensor is put into operation for the first time, for example, by means of magnetic stimulation, which takes place, for example, by starting the engine or the beginning of a trip, a calibration of the sensor takes place, whereby first, the necessary calibration data are determined. In this connection, it can be provided that the sensor runs an implausible signal, so long as it is not calibrated, and as soon as the adjustment of the sensor takes place, a plausible signal is product. The voltage on the sensor is in the normal tolerance range.

Next, the optimal calibration data are determined and the sensor is calibrated, an irreversible storage of the calibration data is initiated and the calibration modus is suppressed. This can happen by means of an equalizing unit, which can be the control apparatus of the motor vehicle, which briefly raises the supply voltage. In this manner, the calibration of the sensor is terminated and the calibration data remain available permanently and directly. By means of a final rest, by means of which the calibration data in the nonvolatile storage medium, of course, are not erased, the sensor can be placed in its base position.

Essential to the inventive method, therefore, is the unchangeable storage of calibration data of the magnetic sensor either in the actual structural position in the vehicle (Variant I) or in a structural position, which is as similar as possible to actual position, on the end of the assembly line of the production of the sensor manufacturers (Variant II). Variant I represents an advantage for the motor vehicle manufacturer, since the tolerances occurring in a motor vehicle are compensate in the frame of the calibration and so an optimum can be achieved relating to insensitivity compared with vibrations with a simultaneous maximizing of the sensitivity.

On the other hand, the calibration and storage of the equalized data, however, must be as simple as possible and able to be safely controlled by work stations. Three variants are parts of this invention:

Variant Ia:
(1) Complete sensor manufacture without equalization by the supplier;
(2) Construction in the motor vehicle. Connection of an equalizing unit to the sensor. Rotation of the associated transmitting wheel (for example for ABS and engine control by driving a short distance). The sensor performs an automatic equalization (for example, by determination of a minimum and maximum, the offset based on the mean value, further determining of an internal intensity factor). Control of the output signal through the equalizing unit. After an adequate count on output sides or pulses is measured, for example the storage of the calibration value is initiated by means of a brief increase of the supply voltage. The sensor stores its calibration value unchangeably and suspends this possibility of the calibration. After removal of the equalizing unit and connection of the control apparatus, the sensor works as a magnetic speed sensor ("normal operation") (see also FIG. 3).

Variant Ib:
(1) Complete sensor manufacture without equalization by the supplier.
(2) Sensor produces an implausible signal after the first connection to the control apparatus. The control apparatus springs into a calibration mode and executes the step provided in (2) under Variant Ia. For controlling of the equalization, for example, the signal for the use of ABS is compared with the output signal of the other speed sensors and a minimum of the of the output speed sensor signals is expected. Upon correct operation, the supply voltage is automatically raised briefly, and therewith, the irreversible storage of the calibration date in the sensor is performed and the storage suspended. The sensor is reset independently after the writing of the calibration data (see also FIG. 3).

Variant II:
(1) Sensor manufacture until the end of the production line of the sensor production;
(2) End of assembly line equalization: The sensor is positioned corresponding to the later structural position in the motor vehicle in front of a transmitting wheel (steel wheel or multi-pole wheel). The calibration takes place automatically under these standard conditions in the sensor. In this connection, the sensor is supplied with a predetermined voltage. An integrated equalization logic determines automatically the value to be stored. After calibration takes place and control of the sensor output signal, for example, the supply voltage is raised briefly. This solicits the sensor to securely stored the calibration data and suspend programming.

Also, after the sensor is programmed, internal post-calibration algorithms, for example, with amplitude limits, can remain active and thereby guarantee a safe operation.

In conclusion, a sensor that correspondingly operates according to the present invention described herein has the following characteristics:

- optimal adaptation of sensor sensitivity and structural situations;
- minimized vibration sensitivity after switching on of the sensor with a maximizing of the sensitivity, that is, the achievable air gap;
- fast and correct re-running after lowering voltage;
- simple and safe equalization method in the actual structural position.

What is claimed is:

1. A method for calibration of a magnetic sensor (1) sensing a position of a target (2, 30), characterized in that the magnetic sensor (1) is arranged in a predetermined position to the target (2, 3), wherein a control unit (6) is arranged externally to the magnetic sensor and is connected to the magnetic sensor (1) and controls a calibration in the sensor, wherein data necessary for the calibration is determined in the magnetic sensor and wherein determined calibration data is stored permanently in a storage medium (5) in the magnetic sensor (1).

2. The method as defined in claim 1, wherein the control unit (6) generates a predetermined signal, wherein said signal is furnished to the sensor (1) for calibration.

3. The method as defined in claim 1, wherein the calibration takes place directly after the manufacture of the sensor (1).

4. The method as defined in claim 1, wherein the predetermined position corresponds to a later structural position.

5. The method as defined in claim 1, wherein the calibration takes place after a prescribed assembly of the sensor (1).

6. The method as defined in claim 5, wherein a prescribed assembly position is in a motor vehicle in which the sensor (1) is connected with the control unit (6), wherein said control unit (6) is a control apparatus of the motor vehicle.

7. The method as defined in clam 6, wherein determination and storage of the calibration data is initiated by means of a start signal.

8. The method as defined in claim 6, wherein a function to be detected from the sensor is performed at least once, wherein corresponding emitted signals from the sensor (1) are checked in the control unit (6) for plausibility, and upon a finding of plausibility, the calibration data is written into the storage medium.

9. The method as defined in claim 6, wherein the function to be detected from the sensor (1) is performed at least once, wherein the corresponding emitted signal from the sensor (1) is checked in the control apparatus for plausibility, and upon a finding plausibility, the calibration data is written into the storage medium (5).

10. The method as defined in claim 5, wherein with a plurality of sensors (1, 1') that serve the same purpose, a plausibility verification takes place by comparing an output signal of the sensor to be calibrated (1) with the output signal of another sensor (1').

11. The method as defined in claim 1, wherein at least a part of the permanently stored data is changeable during operation of the sensor.

12. The method as defined in claim 1, wherein storage of the data takes place by a brief raising of a supply voltage of the sensor through the control apparatus.

* * * * *